United States Patent [19]

Hindin et al.

[11] 3,884,739

[45] May 20, 1975

[54] APPARATUS FOR SIMULTANEOUSLY RECAPPING A PLURALITY OF TIRES WITH PRECURED TREAD RUBBER

[75] Inventors: Herbert B. Hindin, Alamo; Alfred E. Johnson, El Cerrito; Donald P. Knapp, San Francisco, all of Calif.

[73] Assignee: Oliver Tire & Rubber Company, Oakland, Calif.

[22] Filed: Sept. 13, 1973

[21] Appl. No.: 397,014

[52] U.S. Cl. ............... 156/96; 23/290; 156/128; 156/394; 425/34 A
[51] Int. Cl. .................. B29h 5/04; B29h 17/36
[58] Field of Search ...... 156/96, 110, 123, 126–129, 156/394, 394 FM; 264/36, 315, 316, 326; 425/17, 18, 19, 21, 22, 23, 24, 29, 30, 38, 43–47, 56, 383, 389, 60, 253–255; 23/290

[56] References Cited
UNITED STATES PATENTS

| | | | |
|---|---|---|---|
| 2,014,010 | 9/1935 | Wheatley | 156/394 FM |
| 2,675,582 | 4/1954 | Kent | 425/18 |
| 3,236,709 | 2/1966 | Carver | 156/96 |
| 3,325,326 | 6/1967 | Schelkmann | 156/394 FM |
| 3,689,337 | 9/1972 | Schelkmann | 156/394 FM |
| 3,743,564 | 7/1973 | Gross | 156/96 |
| 3,779,833 | 12/1973 | Reppel | 156/96 |

FOREIGN PATENTS OR APPLICATIONS

| | | | |
|---|---|---|---|
| 634,953 | 1962 | Canada | 156/394 |
| 1,157,770 | 1966 | Germany | 156/394 FM |

*Primary Examiner*—Clifton B. Cosby
*Assistant Examiner*—John E. Kittle
*Attorney, Agent, or Firm*—Owen, Wickersham & Erickson

[57] ABSTRACT

The apparatus comprises a housing that accommodates a stack or row of two or more axially aligned tires to be recapped and forms a toroidal chamber around them. Each of the tires are initially prepared for recapping with a band of precured tread rubber around the tire and a flexible envelope having a U-shaped cross section fitted around the band and extending radially inwardly along the tire sidewalls. When the enveloped tires are positioned within the apparatus annular sealing members at opposite ends of the apparatus and a series of annular sealing rings between the tires impinge against the envelopes and cooperate to provide a continuous seal for the toroidal chamber. Means are provided for maintaining a fluid pressure inside of each tire through a central manifold, and a heated fluid such as steam is supplied to the sealed toroidal chamber at a pressure less than pressure inside the tires to cure the bond between the tread rubber and each tire.

21 Claims, 10 Drawing Figures

FIG_3

FIG_4

APPARATUS FOR SIMULTANEOUSLY RECAPPING A PLURALITY OF TIRES WITH PRECURED TREAD RUBBER

BACKGROUND OF THE INVENTION

This invention relates to apparatus for recapping tires and more particularly for recapping a plurality of tires simultaneously with precured tread rubber.

In application for U.S. patent Ser. No. 247,488 filed Apr. 25, 1972 now U.S. Pat. No. 3,779,833, an apparatus is disclosed for recapping a single tire with precured tread rubber wherein a flexible envelope having a U-shaped cross section is utilized. The envelope is installed around the tire after the tread rubber has been positioned on it with the inner edges of the envelope extending inwardly adjacent the sidewalls of the tire. A pair of toroidal mold members are connected together to form a toroidal chamber around the tire and the envelope, and sealing means are provided on the inner sides of the mold members to press the envelope against the tire sidewalls and form a fluid tight seal with the outer surface of the envelope. Heat and pressure are supplied to the toroidal chamber to press the envelope and thus the tread rubber radially inwardly against the tire and thereby cure a layer of bonding rubber between the precured tread rubber and the tire.

Another apparatus for recapping a single tire with precured tread rubber is disclosed in application Ser. No. 369,975, filed June 14, 1973, wherein the flexible envelope extends further inwardly and cooperates with a pair of annular flanges on an internal rim member for the tire to form a seal for a toroidal chamber around the tire. In both of the aforementioned apparatus only a single tire can be recapped at one time. Although such a limited production capability is satisfactory for many retreading operations, particularly for relatively large tires such as truck tires, it is highly desirable to be able to accomplish the recapping of two or more tires simultaneously, especially for smaller tires such as those used on passenger cars. The present invention solves this problem.

It is, therefore, a general object of the present invention to provide an apparatus for simultaneously recapping a plurality of tires with precured tread rubber.

Another object of out invention is to provide an apparatus for recapping a plurality of tires with precured tread rubber that can be used effectively even though the tires in a group being recapped may vary somewhat in size and shape.

Another more specific object of out invention is to provide an apparatus for recapping tires with precured tread rubber which utilizes sealing members for sealing a toroidal chamber around the tires that may be variable in size to accommodate tires of different sizes.

Another object of the invention is to provide an apparatus for simultaneously recapping a plurality of tires with precured tread rubber without causing any significant distortion to the tires during the recapping process.

Yet other objects of our invention are to provide a tire recapping apparatus that affords a high rate of productivity relative to the amount of floor space required, that is easy to operate with a minimum of labor and also easy to service and maintain, and that is particularly well adapted for ease and economy of manufacture.

BRIEF SUMMARY OF THE INVENTION

In broad terms, our invention comprises an apparatus suitable for holding a plurality of tires to be recapped including a generally cylindrical body member with a fixed annular end wall at one end and an attachable end cover member at its other end. Each of the tires to be recapped is initially prepared for the process with a strip of precured tread rubber wrapped around its outer, prepared surface, with a thin layer of uncured bonding material between this tire surface and the tread rubber. A flexible envelope having a U-shaped cross section is drawn over each tire after the precured rubber strip has been wrapped around the prepared tire surface, and this envelope extends radially inwardly beyond the tire sidewalls. Attached to the inner surface of the fixed end walls of the multi-tire apparatus or module is an annular, lower end sealing member. In one embodiment of the invention this sealing member impinges against the flexible envelope of the adjacent tire at its sidewall to form a seal with the envelope. In another embodiment, this lower end sealing member impinges against the envelope at an edge flange of a rim device for the tire to form the envelope seal. Extending axially through the cylindrical body member and the end, each mounted on a rim device and cover member, is a manifold means having an inlet at one end to receive pressurized fluid and a series of outlet connectors spaced apart along its length, each connector being adapted for coupling with the valve of a tire. The tires are stacked around the manifold means. Within each tire, suitable means such as an inner tube or a curing bag is retained by its rim device for maintaining internal tire pressure. Between pairs of adjacent tires being recapped within the apparatus are intermediate sealing members that similarly engage and seal against the flexible envelopes at either the sidewall of the tire or at the edge flange of its rim device. At the other end of the stack of tires within our apparatus is another annular end sealing member that provides a seal between the removable end cover member and the adjacent upper end tires of the stack or its rim device. The upper end sealing member is carefully selected with an axial length so that when the stack of partially pressurized tires is within the body before the recapping cycle commences it fits inside the cover member and the cover member can be attached to the module body member with a suitable locking means. Yet, the axial length of the upper sealing member must be such that when the tires of the stack within the module body are inflated to their operational level during a recapping cycle the internal pressure in the tires will provide an axial expansion of the tire stack to cause the top edge of the upper sealing member to form a fluid tight seal with the cover member. This expansion also causes the other sealing members to similarly seal against their adjacent tires, thereby forming a fluid tight toroidal chamber around the tire stack. With the proper selecting of the upper sealing member all of the sealing between tires is accomplished without any significant distortion to them during the recapping cycle.

When a recapping cycle is commenced with our apparatus pressurized fluid is first supplied to the tires within the cyclindrical body thereby causing all of the sealing members to function and form the toroidal chamber around the tires. A heated fluid such as steam is then supplied to the toroidal chamber at a pressure that is somewhat less than the internal tire pressure and is maintained by a suitable differential pressure control. Thus, heat and pressure within the toroidal chamber is maintained for a preselected time period which is sufficient to cure the bonding material on each tire between its surface and the precured tread rubber.

Other objects, advantages and features of our invention will become apparent from the following detailed description taken in conjunction with the drawing.

DETAILED DESCRIPTION OF EMBODIMENTS

Figures 1, 2:
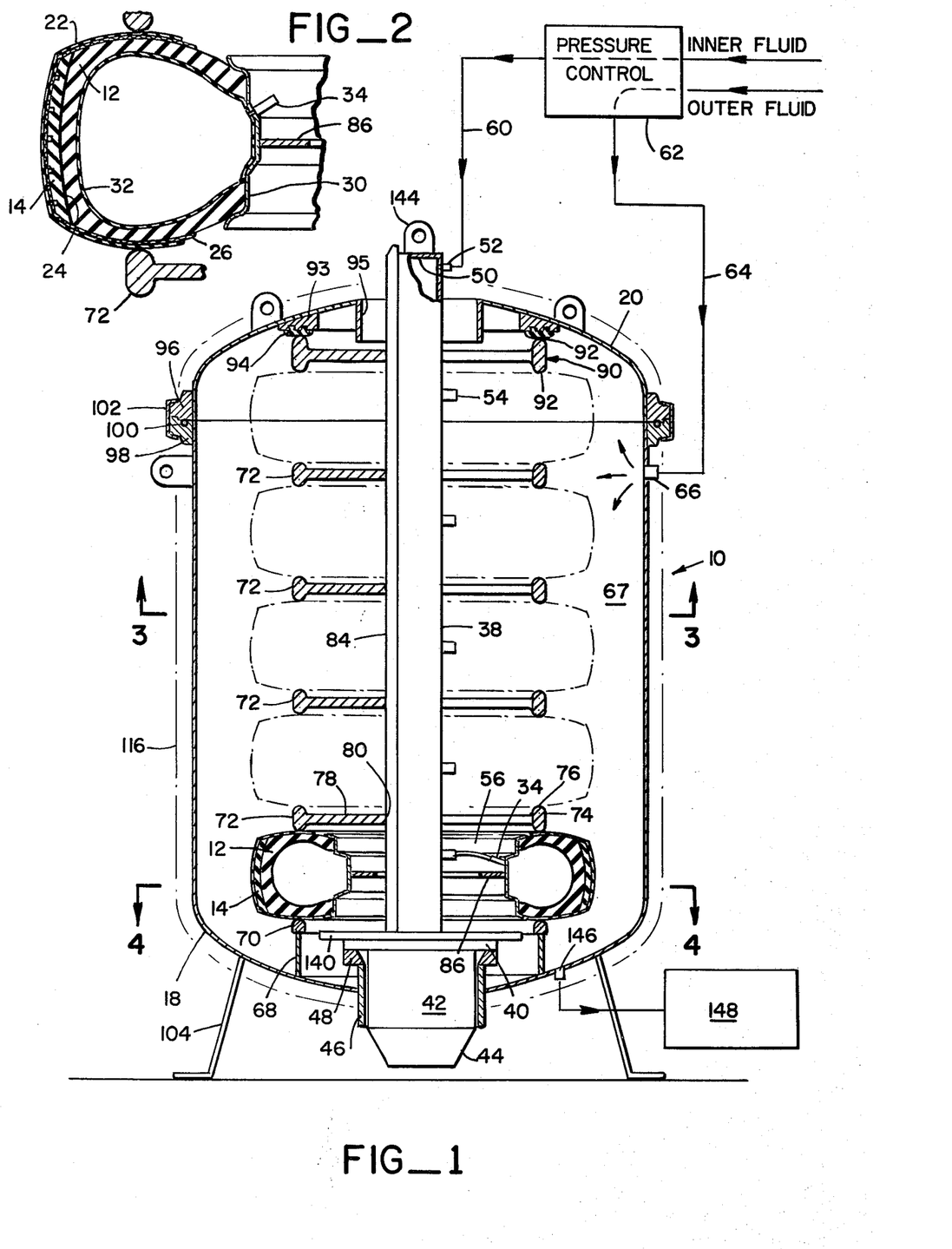
FIG. 1 is a view in elevation and in section showing one form of tire recapping apparatus according to the present invention.
FIG. 2 is an enlarged fragmentary view showing a portion of one tire within the apparatus of FIG. 1.

Referring to the drawing, FIGS. 1-4 show one form of an apparatus 10, according to the present invention, which is capable of simultaneously recapping a plurality of tires 12 with a premolded, precured tread rubber strip 14. In general, it has a cylindrical shape and is comprised of a tubular body member 16, preferably made of a rigid metal with a uniform wall thickness and an overall diameter that is substantially greater than the tires that are to be recapped. Fixed to the bottom end of the body member is an annular dish shaped bottom wall 18, while at the top is an annular, removable cover member 20. Within the body member, the tires are arranged in a co-axial stack or row, and each tire is covered by a flexible envelope 22 which extends over its tread rubber strip 14 and along the sidewalls of the tire. Before the precured tread strip is applied to the tire, the tire casing is buffed to remove old tread and to achieve the desired shape and surface condition. As shown in FIG. 2, a thin layer of uncured rubber material 24 is applied between the tread rubber and the prepared tire surface when the tread strip is placed around the tire. This tread strip may be in the form of a prespliced hoop or ring, or it may be wrapped onto the tire and spliced at its ends when in place.

Placed at circumferentially spaced apart locations on the tire are air venting means such as strips of a woven mesh material 26 that enables air to escape from between the envelope and the tread rubber. This venting material to be effective must extend from the tire tread strip to a point beyond the sealing area on the envelope for each tire. The latter is placed around the tire after the tread strip and the venting means has been installed as described.

In the embodiment of FIG. 1, each tire is mounted on an annular rim device 30 that is shaped in any suitable manner to support the tire beads and prevent them from spreading. The rim device may be of the type that provides an airtight seal along the tire beads, or it may retain an inner tube or curing bag 32 inside the tire in order to maintain the tire under pressure. Each rim device has a valve 34 which provides a means for supplying fluid pressure to the interior of the tire or to the tube or curing bag within the tire.

As shown in FIG. 1, a tire mounting holder and pressure manifold device 38 is provided within the tubular body member 16 which extends through the tires being recapped. This manifold is an elongated tubular member and has a circular plate 40 at its bottom end to which is fixed a downwardly extending cylindrical head 42 with a tapered lower end 44. The head cooperates with a slightly larger cylindrical sleeve member 46 that is fixed within a centrally located opening in the bottom end wall 18. This sleeve member extends upwardly above the inside surface of the end wall 18 and fixed to its top edge is a guide ring 48 having a downwardly diverging inner conical surface. As the manifold device 38 is lowered into the apparatus body, the guide ring 48 helps to deflect the head 42 and cause it to sweat within the sleeve member.

Near the upper end of the manifold device, which is closed by an end wall 50 is an inlet 52 for supplying pressurized fluid to the manifold interior. Spaced apart along the length of the manifold are a series of outlet fittings 54 with attached flexible connectors 56, each of which is coupled to a valve 34 of one of the tires being recapped.

The pressurized fluid supplied to the manifold for the interior of the tires flows through a conduit 60 connected to the inlet 52 and preferably to a differential pressure control mechanism 62. The latter device, which may be of any suitable type that is commercially available, is also connected by a conduit 64 to an inlet 66 in the body member 16 and to another source of fluid under pressure. Thus, the control device automatically controls the fluid pressure differential between the inner fluid supplied to the tire interiors through the valves 34 and the outer fluid supplied in a toroidal chamber 67 surrounding the tires, and in such a manner that the internal tire pressure always exceeds the exterior pressure by some predetermined amount.

Now, spaced outwardly from and concentrically with the centering sleeve member 46 in the bottom wall 18 is an upwardly extending annular flange 68 having a relatively narrow but smoothly curved upper edge 70 forming a lower sealing member. This latter flange has a diameter that causes its edge 70 to engage the sidewall of the lowermost tire 12 within the apparatus.

Located between each pair of adjacent tires within the apparatus is an intermediate sealing member 72, preferably made of a hard, rigid material. Each member 72 has an annular portion 74 which is relatively narrow in cross section with curved end edges 76 similar to that of the lower sealing flange 70.

Figure 3:
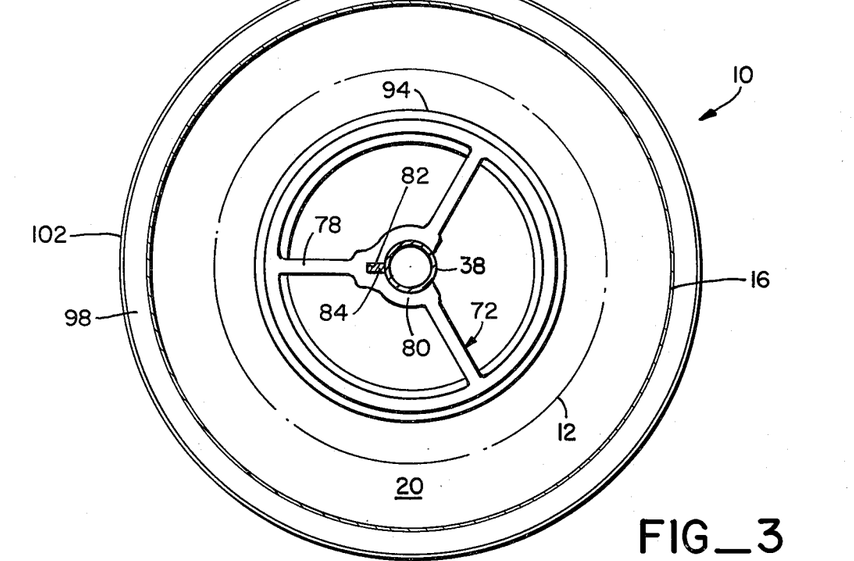
FIG. 3 is a view in section taken along line 3—3 of FIG. 1.
Figure 4:
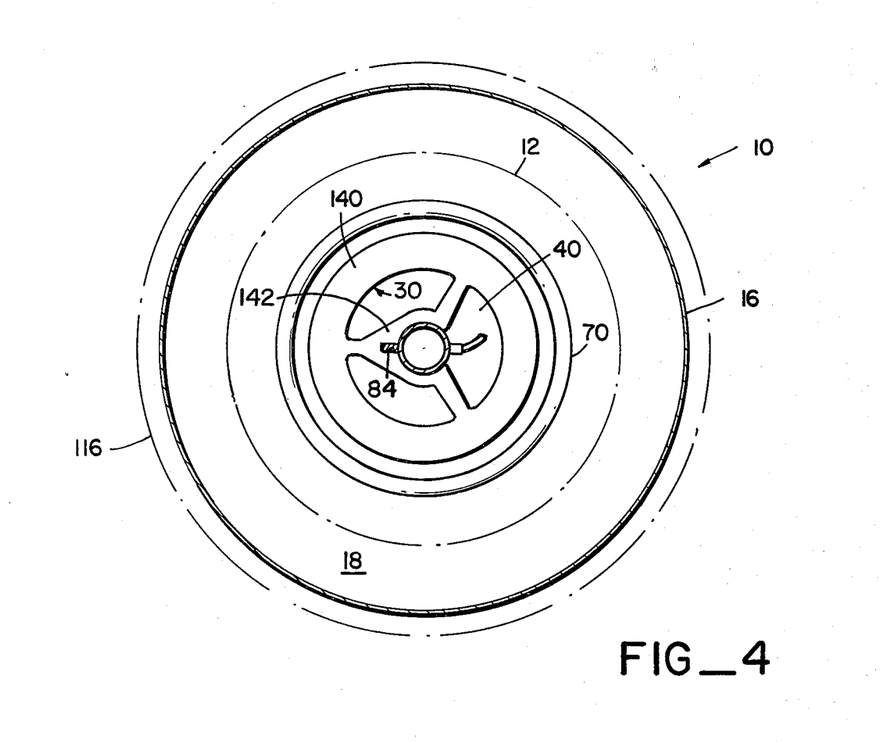
FIG. 4 is a view in section taken along line 4—4 of FIG. 1.

The annular portion, as shown in FIG. 3, is connected by spoke members 78 to a hub 80 having a keyway 82 that fits an elongated key member 84 fixed to one side of the manifold device. This key member serves to maintain the annular portion of each intermediate sealing member at a constant distance from the manifold device. As shown in FIG. 4, the rim device 30 for each tire has a web portion 86 transverse to the tire axis with a central opening including a keyway for the heg member 84 that also holds the tire in a fixed position relative to the manifold device. As shown in FIG. 1, the intermediate sealing members 72 are sized so that their annular portions engage the sidewalls of adjacent tires.

At the top of the stack of tires being recapped within the apparatus 10 is an upper sealing member 90 with an annular portion 92 having curved edges and generally the same diameter but normally a longer axial length than the intermediate sealing members 72. The annular portion of this upper sealing member engages the sidewall of the uppermost tire and also an annular rubber gasket 94 mounted on a rigid ring member 93 fixed to the inside surface of the cover member 20.

The end cover member 20, which is made from a rigid material such as aluminum, is dish shaped and has a central opening formed by a sleeve section 95 through which the upper end of the manifold device 38 extends. A flange 96 extends circumferentially around the outer edge of the top cover and has a planar surface that lies adjacent to the surface of a similar edge flange 98 at the top end of the body member. An elastomeric O-ring 100 seated in a groove in one or both of the adjacent surfaces of the flanges 96 and 98 provides a sealing means between the cover 20 and the body member 16. When the apparatus is fully assembled, the flanges 96 and 98 of the top cover member 20 and body member 16 are connected and held firmly together by a suitable locking device such as a circular locking ring 102 of the well known type having a U-shaped cross section.

In the embodiment of FIGS. 1 – 3, the apparatus is arranged to take tires stacked in a horizontal arrangement, and therefore the lower end wall member 18 has a series of supporting legs 104 to keep it above a supporting surface. If desired, the apparatus could be oriented so that the tires are arranged vertically in their normal upright rolling position, in which case the supporting legs would be attached on one side of the tubular body member 16.

Figures 5, 6, 7:
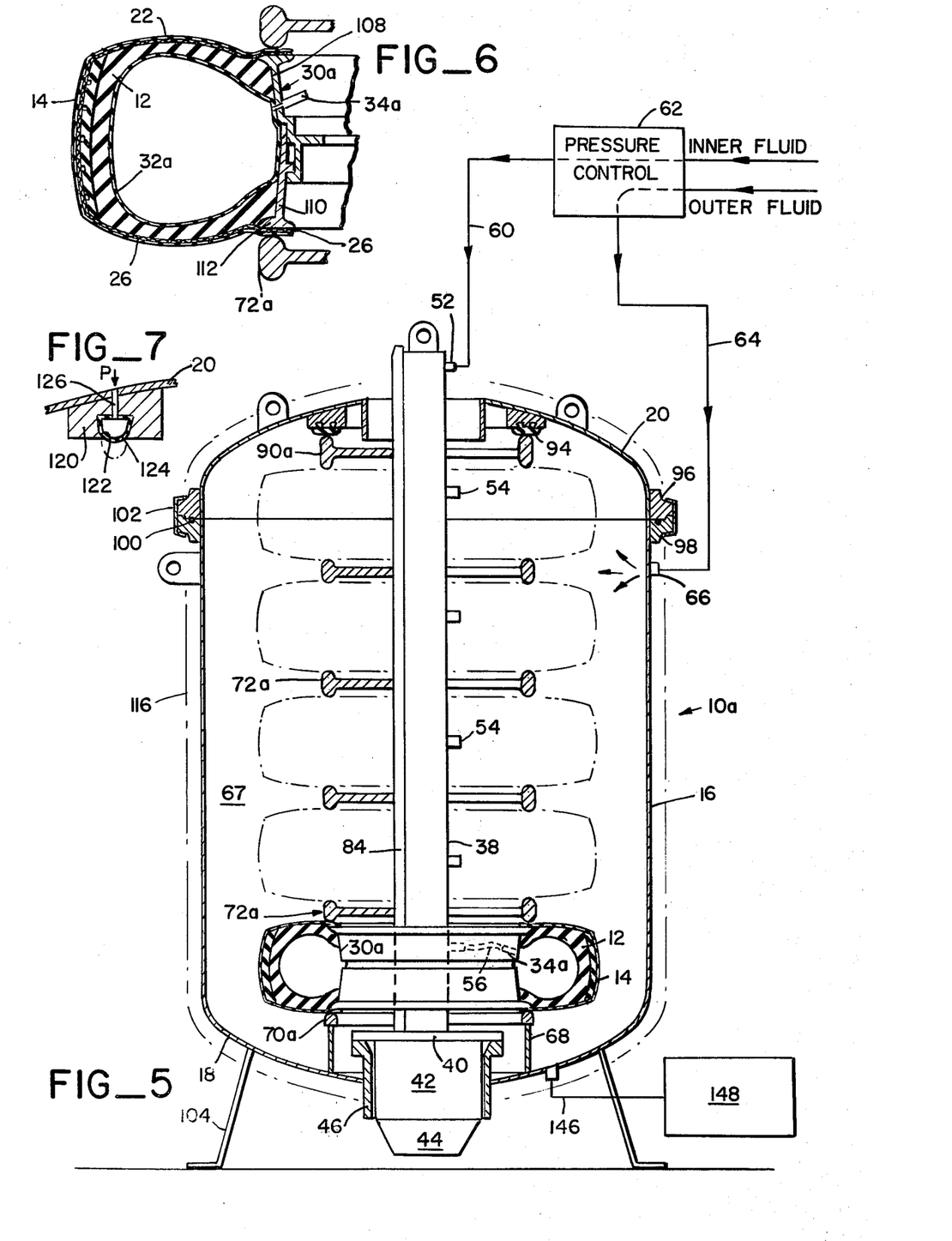
FIG. 5 is a view in elevation and in section showing a modified form of a tire recapping apparatus embodying the principles of our invention.
FIG. 6 is an enlarged fragmentary view in section showing a portion of one tire for the apparatus of FIG. 5 with an extensible rim member.
FIG. 7 is a fragmentary view in section showing an alternate form of sealing member for the apparatus of FIG. 5.

In FIGS. 5 and 6, a modified form of multi-tire recapping apparatus 10a is shown wherein the sealing of the envelope around each tire is accomplished in a somewhat different manner and at a different location on the tire assembly.

In this embodiment, one or more of the tires in a stack is mounted on a rim device 30a comprised of two axially adjustable annular sections 108 and 110 (See FIG. 6) which retain the tire beads but enable them to spread apart a limited amount as the tire is inflated. Each rim section has an outer edge flange 112 that is located outwardly of the tire bead and forms a surface over which the curing envelope 22 extends when the tire is ready for recapping. Also, in this embodiment of our invention, the sealing of the curing envelope for each tire is accomplished at these flanges 112 of the rim sections 30a rather than at the sidewalls of the tires. Therefore, a lower sealing member 70a located on the inside surface of the bottom end wall 18 has a smaller diameter than the sealing member 70 of the first embodiment so that its annular edge is aligned with and presses the envelope of the bottom tire against the lower flange 112 of its rim device.

Between adjacent tires, annular intermediate sealing members 72a similar to those of the first embodiment but smaller in diameter are also used to engage and press the envelope of each tire against the flange of its rim device 30a. At the top of the stack of tires within the apparatus 10a is an upper sealing member 90a similar to the upper sealing member 90 of the apparatus 10 but smaller in diameter so that it presses the envelope 22 of the uppermost tire 12a against the flange of its extendable rim device 30a. The upper annular edge of this upper sealing member may be engaged by an elastomeric gasket 94 mounted on the inner surface of the upper cover member as in the apparatus 10.

As an alternative to the fixed gasket and the upper sealing members 90 and 90a shown in FIGS. 1 and 5, an extensible sealing member may be provided in a somewhat modified form of our apparatus shown in FIG. 7. Here, a ring member 120 fixed to the inner surface of the end cover 20 has an annular groove 122 within which is seated an expandable gasket 124. An opening 126 through the end cover is provided for supplying air pressure "P" from a controllable source to the rear of this gasket, thereby causing it to extend downwardly from the groove. The uppermost tire assembly in the stack of tires being processed is located adjacent to the gasket 124. After the end cover is closed, application of air pressure to the gasket will cause it to extend and provide a sealing contact with either the tire sidewall or the flange of its rim device. Use of the expandable gasket 124 in this embodiment may eliminate the need to use any extensible rim devices 30a.

In the apparatus 10a each rim device 30a is provided with a suitable valve 34a connected to an inner tube or curing bag 32a within the tire, and this valve is coupled to a flexible connector 56 on the manifold device 38, as previously described.

For both of the embodiments the body member 16 may be provided with a means for increasing or retaining heat in the chamber surrounding the tires. For example, the outside of the body member may be wrapped with spaced apart coils of a conduit (not shown) through which a heated fluid may be circulated. Covering the surface of the body member and the coils is a layer of a suitable insulating material 116.

Figures 8, 9, 10:
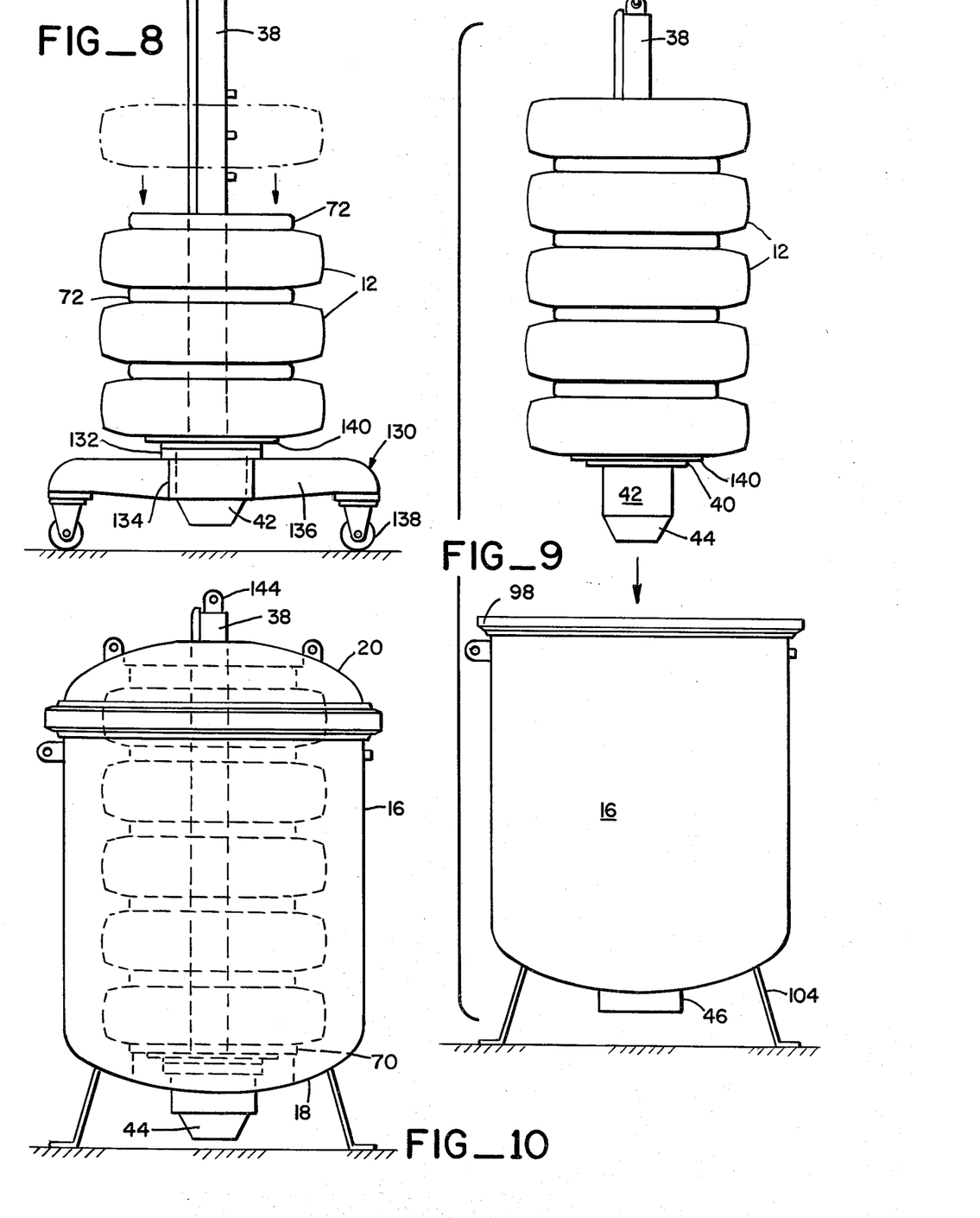
FIG. 8 is a view in elevation showing a series of tires supported on a dolly before installation in an apparatus body member.
FIG. 9 is an exploded view in elevation showing the series of tires of FIG. 8 being loaded into the apparatus body member.
FIG. 10 is a view in elevation showing the apparatus body member with the series of tires inside ready for a recapping cycle and with the cover member secured in place.

When the apparatus 10 is in operation for recapping a plurality of tires the manifold device 38 is placed with its lower head 42 in a temporary holder or stand 130. As shown in FIG. 8, such a stand has a base member 132 with a central sleeve 134 similar to the sleeve member 46 at the lower end wall of the module 10. Preferably the base member has legs 136 with small dolly wheels 138 so that it can be readily moved about. A retaining plate 140 having a hub portion 142 with a slot to fit the key member 84 on the manifold 38 is placed on the manifold and moved downwardly until it engages and is retained by the end plate 40 at the lower end of the manifold. This retaining plate has an outer peripheral portion with a diameter that is large enough to engage the rim device 30 on the lowermost tire as it is lowered into position on the manifold.

Prior to being placed on the manifold, each tire to be recapped is prepared in the conventional manner with its strip of precured tread rubber 14 in place before being mounted on its rim device 32, and an envelope 22 is then drawn over the tread rubber and along the sidewall of the tire. After the first tire is placed on the manifold, a flexible connector 56 is coupled from the tire valve 34 to the appropriate fitting on the manifold. Now, the hub of an intermediate sealing member 72 is placed on the manifold so that its annular ring portion 74 bears against the envelope at the sidewall of the tire (or on the flange of the tire rim device for the apparatus 10a). Another prepared tire assembly is now placed on the manifold followed by yet another intermediate sealing member 72. The manifold is thus fully loaded with a predetermined number of tires with their valves 34 connected to the manifold and with intermediate sealing members between adjacent tires until only a portion of the manifold projects upwardly above the stack of tires. Now, the manifold with the plurality of tires mounted on it may be lifted by an appropriate device connected to an eye 144 at its upper end. The manifold and tires are removed from the movable stand 130 and then lowered into the module, with the lower end of the manifold being guided by the ring 48 into the sleeve member 46 in the bottom end wall 18 of the apparatus. As the manifold and tires are lowered, the sidewall of the bottom tire comes into contact with the lower sealing member 70 which thus presses the envelope 22 against the tire sidewall (or against the rim flange 112 for the apparatus 10a). At this point, a lower inner fluid pressure has been applied to the manifold device and thus to the interior of the various tires. Therefore, with the tires in this relatively low pressure condition the axial distance between the outer sidewalls of the tires at opposite ends of the stack is less than when the tires are fully inflated during an operational cycle. By measuring or observing the amount of manifold that projects from the uppermost tire of the stack, the operator can now select an upper sealing member 90 of the proper size. The axial length of this upper sealing member should be such that it will not interfere with the apparatus cover 20 when the manifold and tires are placed within the module but which will be forced into sealing engagement with the gasket 94 on the inside surface of the cover member when fluid pressure is applied to the interior of the tires. Yet, it must not be too long so that it will cause any improper distortion of the tires during the recapping cycle. With this upper sealing member in place, the cover 20 is now placed on the cylindrical body of the apparatus and the locking ring 102 is closed to hold these two elements firmly together. Fluid pressure is initially applied through the manifold device 38 to the interior of the tires which causes them to inflate and expand. This expansion causes the upper tire to press the upper sealing member into a fluid tight engagement with the gasket 94 on the end cover 20, and it causes all of the tires to press tightly against the adjacent intermediate sealing members 72 and the bottom sealing member 70, thereby forming the sealed toroidal chamber 67 around all of the tires in the apparatus. When the interior tire pressure increases to some predetermined level (e.g. 30 psi), the control device 62 senses this pressure and automatically starts the flow of pressurized fluid through the inlet 66 to the now sealed toroidal chamber surrounding the tires. The control device continues to increase the pressure inside the tires and in the toroidal chamber, while maintaining the desired pressure differential, until the maximum internal tire pressure (e.g. 80 psi) is reached, and it maintains this predetermined pressure differential during the entire recapping cycle as well as during the deflation period at the end of the cycle. Obviously, if desired, the fluid pressure inside and around the tires could be controlled manually rather than with a control device.

Throughout a curing cycle the internal tire pressure maintains the sealing action of all the upper, lower and intermediate sealing members. This allows the pressurized and heated fluid within the toroidal chamber to perform its curing function on the bonding layers 24 between tread strips 14 and their respective tires 12 and also forces out any air trapped under the envelopes of the various tires via their air bleeding means 26. The heated fluid in the toroidal chamber, such as steam or hot water, may be maintained at a temperature in the range of 200° to 400° F., and dissipated heated fluid is released through an outlet 146 near the bottom end wall to atmosphere or to a recharger means 148. The curing time for an entire stack of tires in our apparatus may vary from 20 – 60 minutes depending on the size of the tires and type of bonding materials being used.

For both embodiments of the apparatus, according to our invention, the combination of the tubular body member 16, the end cover member 20 and the various internal sealing members 70, 72 and 90 provide for highly versatile and efficient recapping production. In normal operation of the apparatus, the recapping of all the tires with precured tread rubber is accomplished at a high production rate and without any significant distortion of the tires, so that they are free from weakening residual stresses after the recapping process. Whenever necessary the axial length of the internal sealing members in the apparatus, particularly the upper one, may be varied to accommodate substantial differences in tire sizes. Yet, the apparatus may be easily assembled and put into operation with a minimum expenditure of time and labor.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. Apparatus for simultaneously recapping a plurality of tires arranged as axially aligned tire assemblies, each said assembly including a tire casing, a strip of precured tread rubber about the casing, a rim device contacting the beads of the tire and a flexible envelope covering the precured tread rubber with means for venting air from under the envelope, said apparatus comprising:

a tubular body member with a fixed end wall forming a cavity and adapted to surround the axially aligned tire assemblies;

a removable end cover member forming a fluid tight connection with one end of said body member;

a first annular end sealing member supported by and extending axially from the inner surface of said end wall to engage the envelope of the lowermost tire assembly of said plurality of tire assemblies;

a second annular end sealing means for engaging the envelope of the uppermost tire assembly of said plurality of tire assemblies and for forming a fluid tight seal between it and the inner surface of said end cover member;

annular intermediate sealing members located between pairs of adjacent tire assemblies and bearing against their respective envelopes;

a fluid pressure manifold means extending axially through said tubular body member and said end cover means;

retaining means attached to said manifold means near one end thereof and adapted to support a plurality of stacked tire assemblies so that they can be installed on said retaining means outside of said body member;

centering means attached to and extending axially from said manifold means below said retaining means;

guide means in said fixed end wall for removably receiving said centering means for thereby holding the stacked tire assemblies on said manifold means in substantially axial alignment within said tubular body member;

connector means spaced apart along said manifold means adapted to be coupled to each tire assembly for maintaining a predetermined internal pressure within each said tire; and means for maintaining said end cover member locked to said body member while maintaining internal pressure within the tires to cause said sealing members to assume a fluid tight sealing engagement with said envelopes, thereby forming a sealed toroidal chamber around said tire assemblies for retaining fluid pressure at a level slightly less than said internal pressure.

2. The apparatus as described in claim 1 wherein said sealing members have a diameter larger than said rim device and bear against said envelopes of said tire assemblies along the sidewalls of each tire.

3. The apparatus as described in claim 1 wherein each said rim device has annular flanges at its opposite ends and said sealing members each have a diameter substantially equal to that of said flanges so that all said sealing members bear against said envelopes of said tire assemblies at their said flanges.

4. The apparatus as described in claim 3 wherein at least one said rim device is comprised of relatively slidable annular sections which automatically extend as the tire is inflated and its beads tend to spread apart.

5. The apparatus as described in claim 1 wherein said intermediate sealing members are made from a relatively hard, rigid material and are comprised of an outer annular portion with curved edges and a hub portion that fits around said manifold means.

6. The apparatus as described in claim 5 wherein said second end sealing member is made from the same material as said intermediate sealing members but has a longer axial length.

7. The apparatus as described in claim 1 including a resiliently yieldable annular gasket fixed on the inside surface of said end cover member and having the same diameter as said second annular end sealing means.

8. The apparatus as described in claim 1 wherein said second annular end sealing member comprises an annular inflatable gasket seated within a groove on the inside of said end cover member, said gasket being extensible from said groove when inflated by fluid pressure to contact the envelope of the uppermost tire assembly.

9. The apparatus as described in claim 1 wherein said manifold means has a cylindrical member at its lower end with flange means and is seated within a sleeve member fixed to said fixed end wall of said body member.

10. The apparatus as described in claim 1 including a pressure differential control means responsive to the actual pressure within the tires being recapped to control the pressure of heated fluid being supplied to said toroidal chamber during recapping cycle.

11. A method of simultaneously recapping a plurality of tires comprising the steps of:

preparing each tire as an assembly for recapping by buffing its surface, applying a strip of precured tread rubber around the tire with a layer of uncured bonding material between the buffed tire surface and the precured tread rubber, installing a temporary air venting means on the tread rubber, mounting the tire on a rim device and covering the tire with an annular flexible envelope having a U-shaped cross-section which covers the tread rubber and extends inwardly along the opposite sidewalls of the tire;

placing a first tire assembly on an elongated member;

placing a first annular intermediate sealing member on said first tire assembly so that it engages its envelope and presses it against some portion of the tire assembly;

placing alternatively additional tire assemblies and intermediate sealing members on said first annular sealing member to form a stack of tire assemblies around said elongated member;

placing said stack of tire assemblies around said elongated member within a body member having a fixed end wall and a diameter substantially larger than the largest tire of said stack engaging said centering one end of said elongated member on said fixed end wall so that a toroidal space is formed around said stack within said body member, and sealing said end wall against the envelope of the lowermost tire assembly of the stack when it is lowered into it;

selecting an upper sealing member and placing it on the uppermost tire assembly of said stack;

securing a cover member to said body member;

introducing an inner fluid under pressure to the interior of said tires to produce an axial expansion of said stack which causes all of said sealing members to form a fluid tight seal with their adjacent tire assemblies and therefore a fluid-tight toroidal chamber around the stack; and introducing an outer fluid under pressure to said toroidal chamber at a predetermined pressure level.

12. The method as described in claim 11 wherein said upper sealing member is selected to have an annular sealing ring with an axial length which will provide an initial clearance with said end cover that will allow it to be attached without interference and yet a clearance which will accommodate the axial expansion of said stack to form an adequate fluid tight seal between the upper sealing member and said end cover without causing any significant distortion to the tires in the stack.

13. The method as described in claim 11 wherein said inner and outer pressure is increased in response to an increase of said inner pressure to a predetermined level and is always maintained at a preselected level below the inner pressure.

14. The method as described in claim 11 wherein said sealing members bear against the envelope of each tire assembly along the sidewalls of the tire.

15. The method as described in claim 11 wherein said sealing members bear against the envelope of each tire assembly along a portion of its rim device.

16. The method as described in claim 11 wherein at least one of said tire assemblies provides sufficient axial expansion to cause all of said sealing members to seal upon the introduction of the inner pressure fluid.

17. Apparatus for simultaneously recapping a plurality of tires arranged as axially aligned tire assemblies, each said assembly including a tire casing, a strip of precured tread rubber around the casing, a rim device contacting the beads of the tire and a flexible envelope covering the precured tread rubber and air venting means thereon and extending radially inwardly along the tire sidewalls, said apparatus comprising:

- a body member with a fixed end wall forming a cavity and adapted to surround the axially aligned tire assemblies;
- a removable end member forming a fluid tight connection with one end of said body member;
- a first end sealing means adjacent said end wall for engaging the envelope of the lowermost tire assembly of said plurality of tire assemblies;
- intermediate sealing members located between pairs of adjacent tire assemblies and bearing against their respective envelopes;
- an elongated manifold means extending axially through said tubular body member and adapted to extend through the central axes of the aligned tire casings being recapped;
- retaining means fixed to the lower end of said elongated means for engaging said fixed end wall and for centering the tire assemblies thereon within said body member;
- means for coupling each said tire assembly to a fluid pressure source for maintaining a predetermined internal pressure within each said tire;
- a second end sealing means for engaging the envelope of the uppermost tire assembly of said plurality of tire assemblies and said removable end member; and
- said second end sealing means having an axial length that is short enough to allow said removable end cover to be installed and long enough to form a fluid tight seal between the end cover and the uppermost tire when internal pressure is applied within the tires and to maintain the sealing engagement of all said sealing means against their adjacent tire assemblies and thereby form a toroidal chamber around the tire assemblies without significantly distorting any tire when fluid under pressure at a level less than said internal pressure is supplied to said toroidal chamber during a recapping cycle.

18. The apparatus as described in claim 17 wherein said sealing members are rigid, annular members with a diameter larger than the rim device of each tire and bear against said envelopes of said tire assemblies along the sidewalls of each tire.

19. The apparatus as described in claim 17 wherein each said rim device has annular flanges at its opposite ends and said sealing members are rigid annular members with a diameter substantially equal to that of said flanges so that all said sealing members bear against said envelopes of said tire assemblies at their said flanges.

20. The apparatus as described in claim 17 wherein said elongated means is a hollow manifold with an inlet at one end to receive an inner fluid under pressure and outlets spaced apart along its length for connection with each said tire assembly.

21. The apparatus as described in claim 20 including means fixed to the lower end of said elongated means for centering it and the tire assemblies and sealing means mounted thereon within said body member.

* * * * *